United States Patent
Ieuji

(10) Patent No.: US 11,364,453 B2
(45) Date of Patent: Jun. 21, 2022

(54) LIQUID CHROMATOGRAPH, MOBILE PHASE SUPPLY DEVICE, LIQUID CHROMATOGRAPH ANALYSIS METHOD AND MOBILE PHASE SUPPLY METHOD

(71) Applicant: SHIMADZU CORPORATION, Kyoto (JP)

(72) Inventor: Atsushi Ieuji, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 499 days.

(21) Appl. No.: 16/546,409

(22) Filed: Aug. 21, 2019

(65) Prior Publication Data

US 2020/0061494 A1    Feb. 27, 2020

(30) Foreign Application Priority Data

Aug. 22, 2018    (JP) .............................. JP2018-155792

(51) Int. Cl.
*G01N 30/34*    (2006.01)
*B01D 15/10*    (2006.01)
(Continued)

(52) U.S. Cl.
CPC ............. *B01D 15/10* (2013.01); *G01N 30/04* (2013.01); *G01N 30/54* (2013.01); *G01N 2030/027* (2013.01)

(58) Field of Classification Search
CPC ........ B01D 15/10; G01N 30/04; G01N 30/54; G01N 2030/027; G01N 2030/347;
(Continued)

(56) References Cited

U.S. PATENT DOCUMENTS 4,333,736 A * 6/1982 Shachar .................. F24S 10/13
23/302 R
4,395,385 A * 7/1983 Welsh ................ B01D 53/1493
423/566.2
(Continued)

FOREIGN PATENT DOCUMENTS

GB        2495777 A    4/2013
JP     2002-501622 A    1/2002
(Continued)

OTHER PUBLICATIONS

Communication dated Jan. 22, 2020, from the European Patent Office in application No. 19191160.1.
(Continued)

*Primary Examiner* — David J Bolduc
(74) *Attorney, Agent, or Firm* — Sughrue Mion, PLLC

(57) ABSTRACT

An aqueous solution including salt stored in a first storage is led to a mixer through a first pipe, and an organic solvent stored in a second storage is led to the mixer through a second pipe. The aqueous solution and the organic solvent are mixed by the mixer, so that a mobile phase is produced. At least a portion of the first pipe and at least a portion of the second pipe are heated by a heater such that a temperature of the mobile phase produced by the mixer is equal to or higher than the dissolution temperature of salt included in the aqueous solution.

6 Claims, 7 Drawing Sheets

(51) Int. Cl.
*G01N 30/54* (2006.01)
*G01N 30/04* (2006.01)
*G01N 30/02* (2006.01)

(58) Field of Classification Search
CPC ........ G01N 30/34; G01N 30/02; G01N 30/20; G01N 30/30; G01N 30/88
See application file for complete search history.

(56) References Cited

U.S. PATENT DOCUMENTS

| | | | |
|---|---|---|---|
| 4,492,637 A * | 1/1985 | Tao | B01D 15/00 568/920 |
| 6,260,407 B1 | 7/2001 | Petro et al. | |
| 6,265,226 B1 | 7/2001 | Petro et al. | |
| 6,294,388 B1 | 9/2001 | Petro | |
| 6,406,632 B1 | 6/2002 | Safir et al. | |
| 6,416,663 B1 | 7/2002 | Miroslav et al. | |
| 6,454,947 B1 | 9/2002 | Safir et al. | |
| 6,461,515 B1 | 10/2002 | Safir et al. | |
| 6,491,823 B1 | 12/2002 | Safir et al. | |
| 6,492,184 B1 | 12/2002 | Petro et al. | |
| 6,577,392 B1 | 6/2003 | Nielsen et al. | |
| 2001/0027949 A1 | 10/2001 | Safir et al. | |
| 2001/0037674 A1 | 11/2001 | Petro et al. | |
| 2002/0174713 A1 | 11/2002 | Petro et al. | |
| 2004/0025575 A1 | 2/2004 | Petro et al. | |
| 2006/0054558 A1 | 3/2006 | Jones et al. | |
| 2013/0134079 A1 | 5/2013 | Jarrell et al. | |
| 2015/0253293 A1 * | 9/2015 | Ohashi | G01N 30/02 702/25 |

FOREIGN PATENT DOCUMENTS

| | | | |
|---|---|---|---|
| JP | 2008-232729 A | 10/2008 | |
| JP | 2010-156660 A | 7/2010 | |
| JP | 5223685 B2 | 6/2013 | |
| WO | WO-2010148143 A1 * | 12/2010 | ........... C07K 14/005 |

OTHER PUBLICATIONS

Notice of Reasons for Refusal dated Nov. 9, 2021 from the Japanese Patent Office in Japanese Application No. 2018-155792.

Office Action dated Apr. 28, 2022 in Chinese Application No. 201910778900.1.

Huber et al., "Rapid Analysis of Biopolymers on Modified Non-Porous Polystyrene-Divinylbenzene Particles", Chromatographia, 1993, vol. 37, No. 11/12, pp. 653-658 (6 pages total).

Aymard et al., "Determination of twelve antiretroviral agents in human plasma sample using reversed-phase high-performance liquid chromatography", Journal of Chromatography B, 2000, vol. 744, pp. 227-240 (14 pages total).

* cited by examiner

LIQUID CHROMATOGRAPH, MOBILE PHASE SUPPLY DEVICE, LIQUID CHROMATOGRAPH ANALYSIS METHOD AND MOBILE PHASE SUPPLY METHOD

BACKGROUND OF THE INVENTION

Field of the Invention

The present invention relates to a liquid chromatograph, a mobile phase supply device, a liquid chromatograph analysis method and a mobile phase supply method for supplying a mobile phase.

Description of Related Art

In a liquid chromatograph, a liquid mixture of an aqueous solution including salt (hereinafter simply referred to as an aqueous solution) and an organic solvent may be used. For example, the aqueous solution and the organic solvent are mixed in a common bottle in advance, so that a liquid mixture is produced. In this case, precipitation of salt in the aqueous solution hardly occurs. Even if precipitation of salt occurs, it is possible to re-dissolve the salt in the liquid mixture by stirring the liquid mixture in the bottle.

In the meantime, an aqueous solution and an organic solvent are stored in separate bottles, and a liquid mixture may be produced by mixing of the aqueous solution and the organic solvent that are supplied from the bottle in a common flow path at the time of analysis of a sample. In this case, the concentration of the organic solvent is high at the interface where the aqueous solution and the organic solvent come into contact with each other, so that precipitation of salt is likely to occur. When the concentration of the organic solvent is high, this problem becomes more apparent.

JP 2010-156660 A describes a mobile phase supply device that supplies a liquid mixture of a buffer in which salt is dissolved (hereinafter simply referred to as a buffer) and an organic solvent as a mobile phase. In this mobile phase supply device, the buffer stored in a first storage tank is supplied to a liquid sending pump through a first electromagnetic valve, a first check valve and a mixing flow path. Further, the organic solvent stored in the second storage tank is supplied to the liquid sending pump through a second electromagnetic valve, a second check valve and the mixing flow path. The buffer and the organic solvent are mixed in a pump chamber of the liquid sending pump.

BRIEF SUMMARY OF THE INVENTION

In the mobile phase supply device described in JP 2010-156660 A, even in the case where precipitation of salt occurs when the buffer and the organic solvent come into contact with each other in the mixing flow path, salt is prevented from entering the first and second electromagnetic valves by first and second check valves. However, precipitation of salt itself cannot be prevented, and stable supply of a mobile phase may be prevented by the precipitated salt.

An object of the present invention is to provide a liquid chromatograph, a mobile phase supply device, a liquid chromatograph analysis method and a mobile phase supply method that enable stable supply of a mobile phase.

(1) A liquid chromatograph according to one aspect of the present invention includes a mobile phase supply device that produces a mobile phase, an injector to which the mobile phase produced by the mobile phase supply device and a sample are supplied, a column into which the mobile phase and the sample that have been supplied to the injector are introduced, and a detector that detects the sample that has passed through the column, wherein the mobile phase supply device includes a first storage that stores an aqueous solution including salt, a second storage that stores an organic solvent, a mixer that produces the mobile phase by mixing the aqueous solution stored in the first storage with the organic solvent stored in the second storage, a first pipe that connects the mixer to the first storage, a second pipe that connects the mixer to the second storage, and a heater that heats at least a portion of the first pipe and at least a portion of the second pipe such that a temperature of the mobile phase produced by the mixer is equal to or higher than a dissolution temperature of salt included in the aqueous solution.

In this liquid chromatograph, the mobile phase produced by the mobile phase supply device and the sample are supplied to the injector. The mobile phase and the sample that have been supplied to the injector are introduced to the column, and the sample that has passed through the column is detected by the detector.

In the mobile phase supply device, the aqueous solution including salt stored in the first storage is led to the mixer through the first pipe, and the organic solvent stored in the second storage is led to the mixer through the second pipe. The aqueous solution and the organic solvent are mixed by the mixer, so that the mobile phase is produced. Here, at least the portion of the first pipe and at least the portion of the second pipe are heated by the heater such that the temperature of the mobile phase produced by the mixer is equal to or higher than the dissolution temperature of salt included in the aqueous solution.

With this configuration, the aqueous solution and the organic solvent are heated at positions further upstream than the mixer such that the temperature of the mobile phase is equal to or higher than the dissolution temperature of salt included in the aqueous solution. Therefore, even when the aqueous solution and the organic solvent come into contact with each other, precipitation of salt is prevented regardless of the concentration of the organic solvent. Therefore, salt does not prevent stable supply of the mobile phase. Thus, the mobile phase can be stably supplied.

(2) The liquid chromatograph may further include a column oven that stores the column and adjusts a temperature of the column, wherein the column oven may include the heater and heat at least the portion of the first pipe and at least the portion of the second pipe while further storing at least the portion of the first pipe and at least the portion of the second pipe. In this case, it is not necessary to provide the heater for heating at least the portion of the first pipe and at least the portion of the second pipe separately from the column oven. Thus, the mobile phase supply device can be made compact while the cost of the mobile phase supply device is reduced.

(3) A mobile phase supply device according to another aspect of the present invention that supplies a mobile phase to be used in liquid chromatograph analysis of a sample includes a first storage that stores an aqueous solution including salt, a second storage that stores an organic solvent, a mixer that produces a mobile phase by mixing the aqueous solution stored in the first storage with the organic solvent stored in the second storage, a first pipe that connects the mixer to the first storage, a second pipe that connects the mixer to the second storage, and a heater that heats at least a portion of the first pipe and at least a portion of the second pipe such that a temperature of the mobile phase produced by the mixer is equal to or higher than a dissolution temperature of salt included in the aqueous solution.

In this mobile phase supply device, even when the aqueous solution comes into contact with the organic solvent, precipitation of salt is prevented regardless of the concentration of the organic solvent. Therefore, salt does not prevent stable supply of the mobile phase. Thus, the mobile phase can be stably supplied.

(4) A liquid chromatograph analysis method according to yet another aspect of the present invention includes producing a mobile phase by a mobile phase supply device, supplying the mobile phase produced by the mobile phase supply device and a sample to an injector, introducing the mobile phase and the sample that have been supplied to the injector to a column, and detecting the sample that has passed through the column by a detector, wherein the producing the mobile phase by the mobile phase supply device includes leading an aqueous solution including salt stored in a first storage to a mixer through a first pipe, leading an organic solvent stored in a second storage to the mixer through a second pipe, producing the mobile phase by mixing the aqueous solution and the organic solvent by the mixer, and heating at least a portion of the first pipe and at least a portion of the second pipe by a heater such that a temperature of the mobile phase produced by the mixer is equal to or higher than a dissolution temperature of salt included in the aqueous solution.

This liquid chromatograph analysis method prevents precipitation of salt regardless of the concentration of the organic solvent even when the aqueous solution and the organic solvent come into contact with each other in the mobile phase supply device. Therefore, salt does not prevent stable supply of the mobile phase. Thus, the mobile phase can be stably supplied.

(5) The liquid chromatograph analysis method may further include adjusting a temperature of the column by a column oven storing the column, wherein the column oven may include the heater, and the heating at least the portion of the first pipe and at least the portion of the second pipe may include storing at least the portion of the first and at least the portion of the second pipe in the column oven, and heating at least the portion of the first pipe and at least the portion of the second pipe by the column oven. this case, the mobile phase supply device can be made compact while the cost of the mobile phase supply device is reduced.

(6) A mobile phase supply method according to yet another aspect of the present invention of supplying a mobile phase to be used in liquid chromatograph analysis of a sample includes leading an aqueous solution including salt stored in a first storage to a mixer through a first pipe, leading an organic solvent stored in a second storage to the mixer through a second pipe, producing the mobile phase by mixing the aqueous solution and the organic solvent by the mixer, and heating at least a portion of the first pipe and at least a portion of the second pipe by a heater such that a temperature of the mobile phase produced by the mixer is equal to or higher than a dissolution temperature of salt included in the aqueous solution.

Even when the aqueous solution and the organic solvent come into contact with each other, this mobile phase supply method prevents precipitation of salt regardless of the concentration of the organic solvent. Therefore, salt does not prevent stable supply of the mobile phase. Thus, the mobile phase can be stably supplied.

Other features, elements, characteristics, and advantages of the present invention will become more apparent from the following description of preferred embodiments of the present invention with reference to the attached drawings.

BRIEF DESCRIPTION OF THE SEVERAL VIEWS OF THE DRAWING

DESCRIPTION OF THE PREFERRED EMBODIMENTS (1) Configuration of Liquid Chromatograph Details of a mobile phase supply device, a liquid chromatograph, a mobile phase supply method and a liquid chromatograph analysis method according to an embodiment of the present invention will be described below with reference to drawings. FIG. 1 is a diagram showing the configuration of the liquid chromatograph according to one embodiment of the present invention. The liquid chromatograph 100 of FIG. 1 is an HPLC (High-Performance Liquid Chromatograph).

As shown in FIG. 1, the liquid chromatograph 100 includes a mobile phase supply device 10, an injector 20, a column oven 30 and a detector 40. The column oven 30 includes a heater. A column 31 is stored inside of the column oven 30, and the temperature inside of the column oven 30 is adjusted to a certain constant temperature.

Figure 1:
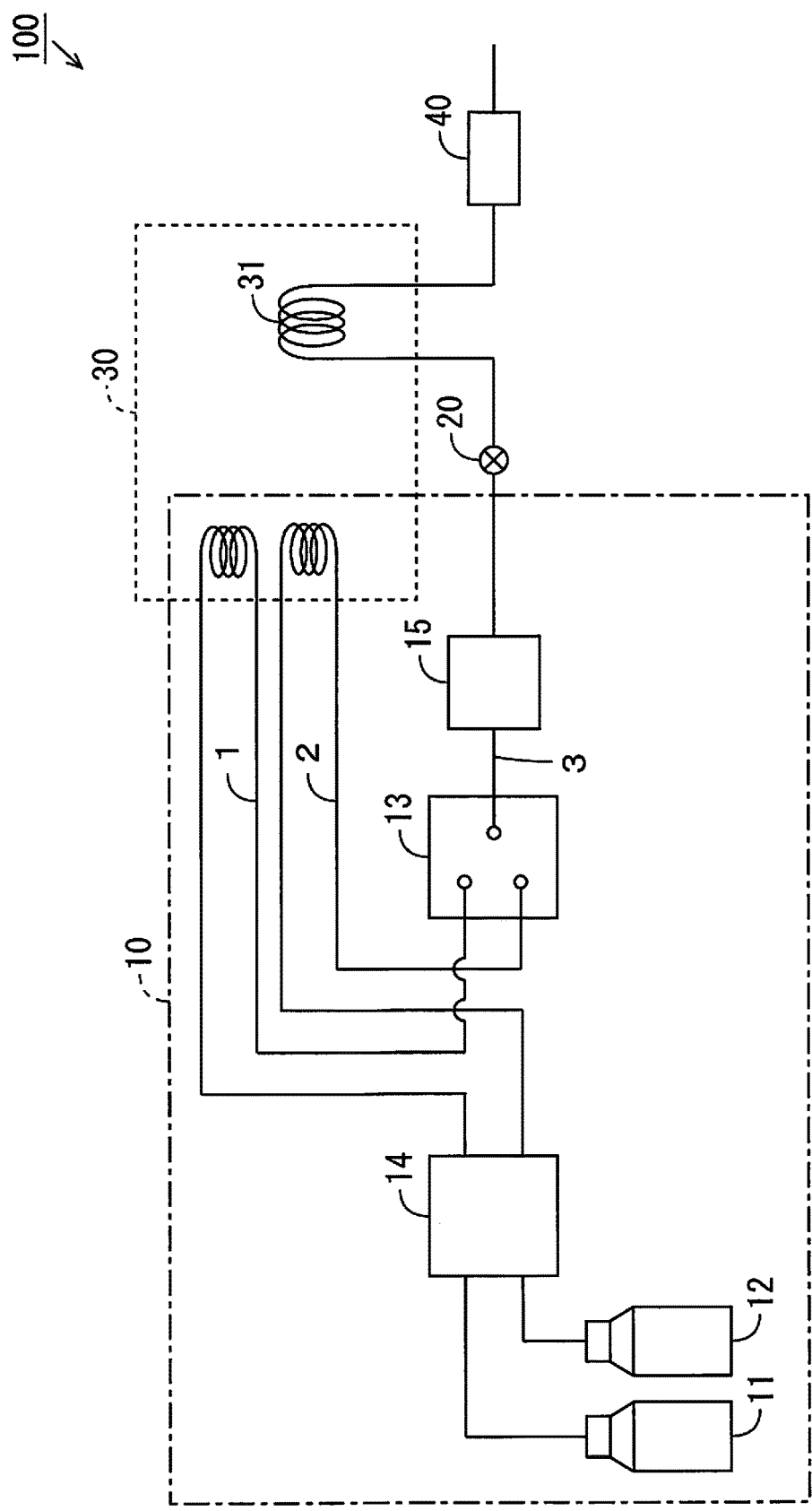
FIG. 1 is a diagram showing the configuration of a liquid chromatograph according to one embodiment of the present invention.

The mobile phase supply device 10 includes pipes 1, 2, 3, storages 11, 12, a mixer 13, a degassing device 14 and a liquid sender 15. Further, in the present embodiment, the mobile phase supply device 10 includes a portion (the heater) of the column oven 30. The storage 11 is a chemical liquid bottle and stores an aqueous solution including salt (hereinafter simply referred to as an aqueous solution). The storage 12 is a chemical liquid bottle similar to the storage 11 and stores an organic solvent. The storages 11, 12 are examples of first and second storages, respectively.

The mixer 13 is a low-pressure gradient unit, for example, and includes ports A, B, C. The storage 11 and the port A of the mixer 13 are connected to each other by the pipe 1. The storage 12 and the port B of the mixer 13 are connected to each other by the pipe 2. The pipes 1, 2, are examples of first and second pipes, respectively. The pipe 3 is connected to the port C of the mixer 13. The mixer 13 produces a mobile phase by mixing the aqueous solution that has been supplied from the storage 11 to the port A through the pipe 1 and the organic solvent that has been supplied from the storage 12 to the port B through the pipe 2, and outputs the produced mobile phase from the port C.

In the following description, the upstream and downstream are defined in the liquid chromatograph 100 based on the flow of the aqueous solution or the organic solvent. At least respective portions of the respective pipes 1, 2 located at positions further upstream than the mixer 13 are heated such that the temperature of the mixed mobile phase is equal to or higher than the dissolution temperature of salt included in the aqueous solution. In the present embodiment, the respective portions of the respective pipes 1, 2 are arranged in the column oven 30. Thus, in the column oven 30, heat exchange can be carried out on the aqueous solution and the organic solvent to make the temperature of the mixed mobile phase be equal to or higher than the dissolution temperature of salt.

The respective portions of the respective pipes 1, 2 arranged in the column oven 30 may be formed to be loop-like. In this case, the respective portions of the respective pipes 1, 2 arranged in the column oven 30 can be maintained compact while being sufficiently long. As a result, the above-mentioned heat exchange can be more easily carried out.

The degassing device 14 is provided at the pipes 1, 2 and removes the gas included in the aqueous solution flowing through the pipe 1 and the gas included in the organic solvent flowing through the pipe 2. The liquid sender 15 is a pump unit, for example, and is provided at the pipe 3. The liquid sender 15 sends the mobile phase that is output from the port C of the mixer 13 downstream under pressure.

The injector 20, the column 31 and the detector 40 are provided in this order at positions further downstream than the liquid sender 15 in the pipe 3. A sample to be measured is supplied to the injector 20 and introduced into the column 31 together with the mobile phase that is sent by the liquid sender 15 under pressure. The sample that has been introduced into the column 31 is separated into its components, and the components are respectively eluted in different lengths of time. The detector 40 detects the eluted sample from the column 31.

(2) Modified Example

Figure 2:
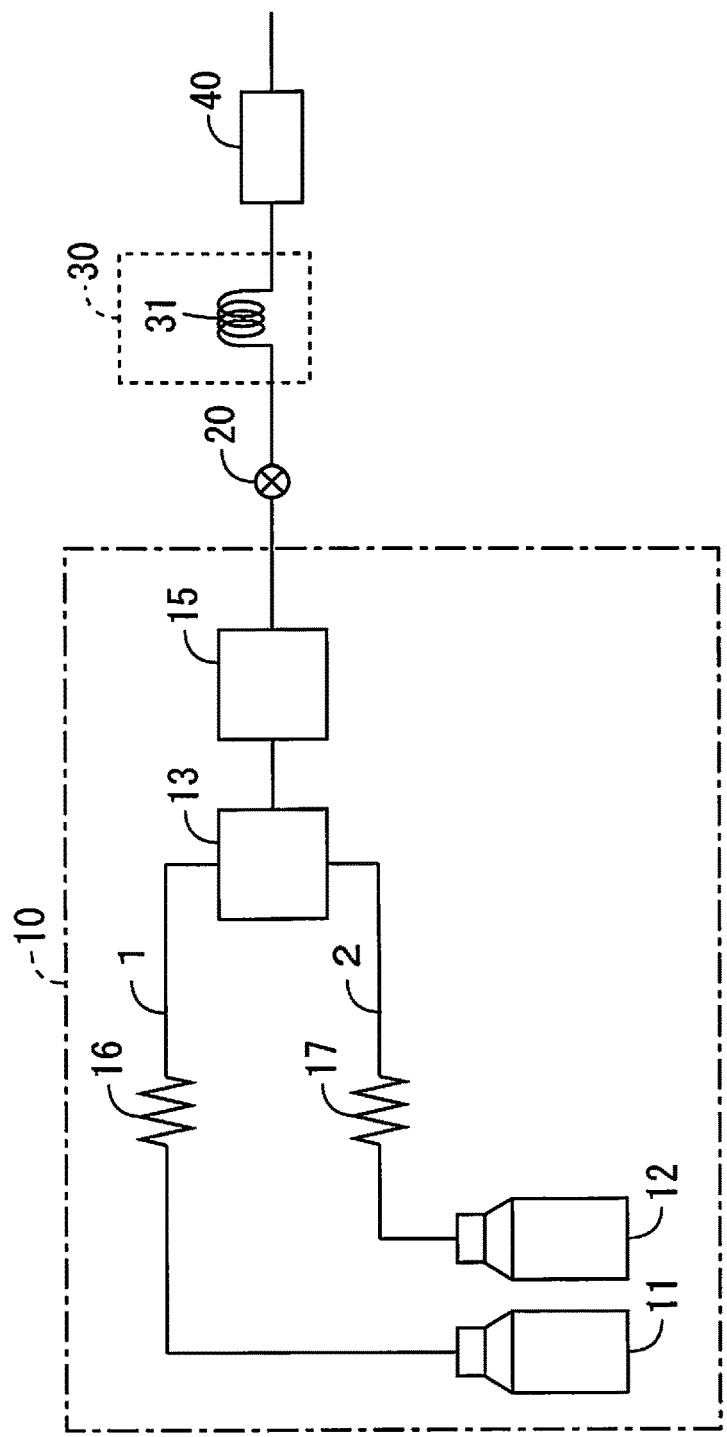
FIG. 2 is a diagram showing the configuration of a liquid chromatograph according to a first modified example.

FIG. 2 is a diagram showing the configuration of a liquid chromatograph 100 according to a first modified example. As shown in FIG. 2, the liquid chromatograph 100 according to the first modified example includes heaters 16, 17. Although not including the degassing device 14, the liquid chromatograph 100 according to the first modified example may include the degassing device 14. The same also applies to a liquid chromatograph 100 according to the second modified example, described below.

The heaters 16, 17 may be a hot water bath, an electric heater, a peltier element or the like, and at least respective portions of respective pipes 1, 2 are heated such that the temperature of a mixed mobile phase is equal to or higher than the dissolution temperature of salt included in an aqueous solution. In this case, respective portions of the respective pipes 1, 2 do not have to be arranged in the column oven 30. Instead of the heaters 16, 17, the liquid chromatograph 100 according to the first modified example may include a common heater that heats a mixer 13.

Figure 3:
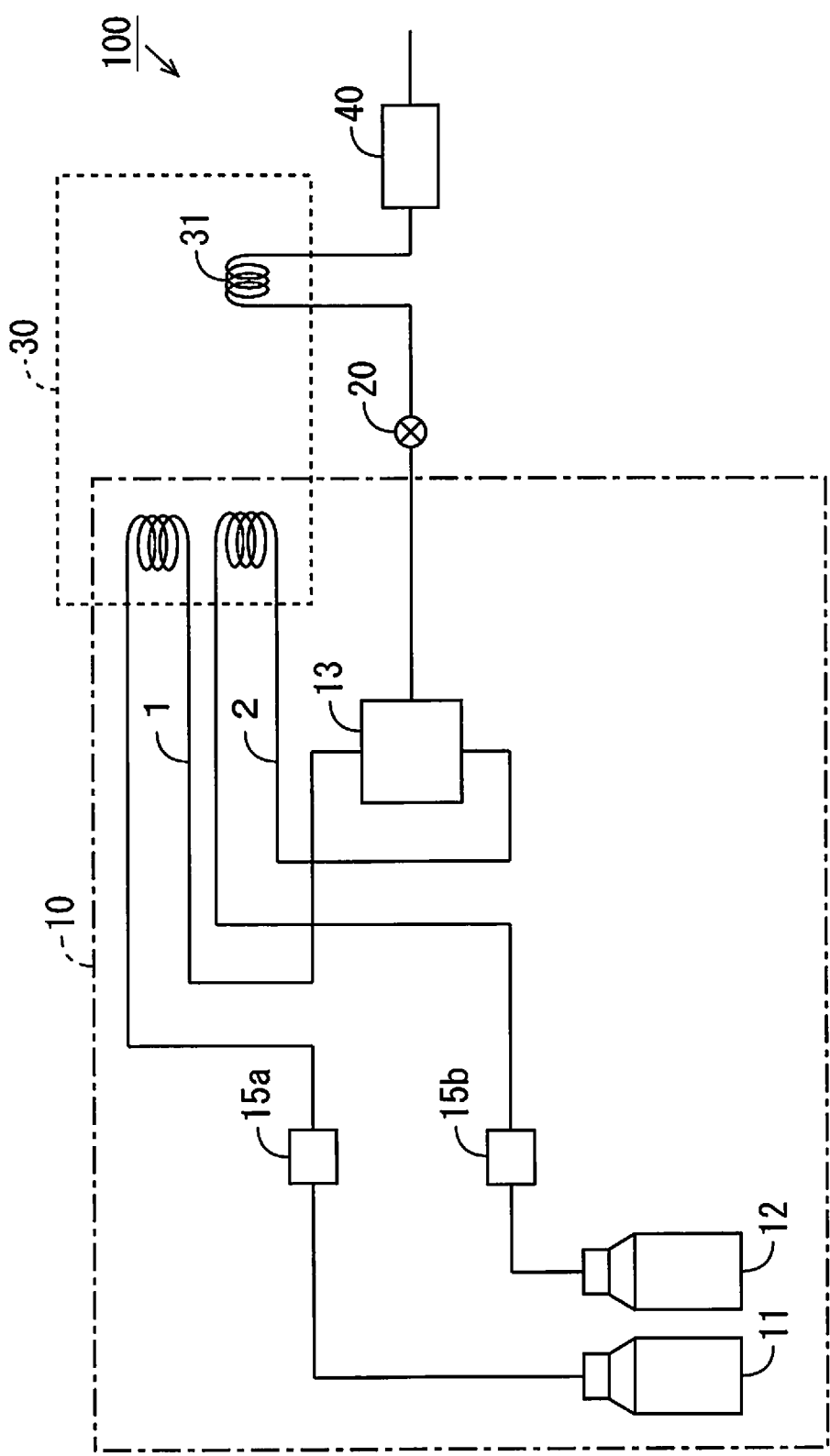
FIG. 3 is a diagram showing the configuration of a liquid chromatograph according to a second modified example.

FIG. 3 is a diagram showing the configuration of a liquid chromatograph 100 according to a second modified example. As shown in FIG. 3, the liquid chromatograph 100 according to the second modified example includes liquid senders 15a, 15b similar to the liquid sender 15 instead of the liquid sender 15. Further, a mixer 13 is not a low-pressure gradient unit but a mixer unit, for example.

The liquid sender 15a is provided at a pipe 1 and sends an aqueous solution stored in a storage 11 towards the mixer 13. The liquid sender 15b is provided at a pipe 2 and sends an organic solvent stored in a storage 12 towards the mixer 13. In this case, the aqueous solution and the organic solvent are sent by separate liquid senders 15a, 15b. Thus, a sample can be analyzed using a high-pressure gradient method.

The liquid chromatograph 100 according to the second modified example may include the heaters 16, 17 similar to the heaters of the first modified example or a common heater that heats the mixer 13. In this case, respective portions of the respective pipes 1, 2 do not have to be arranged inside of a column oven 30.

(3) Effects

In the liquid chromatograph 100 according to the present embodiment, the mobile phase produced by the mobile phase supply device 10 and the sample are supplied to the injector 20. The mobile phase and the sample that have been supplied to the injector 20 are introduced into the column 31 stored in the column oven 30, and the sample that has passed through the column 31 is detected by the detector 40.

In the mobile phase supply device 10, the aqueous solution including salt stored in the storage 11 is led to the mixer 13 through the pipe 1, and the organic solvent stored in the storage 12 is led to the mixer 13 through the pipe 2. The mobile phase is produced by the mixture of the aqueous solution and the organic solvent by the mixer 13. Here, at least the portion of the pipe 1 and at least the portion of the pipe 2 are stored in the column oven 30. At least the portion of the pipe 1 and at least the portion of the pipe 2 are heated by the column oven 30 such that the temperature of the mobile phase produced by the mixer 13 is equal to or higher than the dissolution temperature of salt included in the aqueous solution.

With this configuration, the aqueous solution and the organic solvent are heated at positions further upstream than the mixer 13 such that the temperature of the mobile phase is equal to or higher than the dissolution temperature of salt included in the aqueous solution. Therefore, even when the aqueous solution comes into contact with the organic solvent, precipitation of salt is prevented regardless of the concentration of the organic solvent. Therefore, salt does not prevent stable supply of the mobile phase. Thus, the mobile phase can be stably supplied.

Further, because at least the portion of the pipe 1 and at least the portion of the pipe 2 are heated by the column oven 30 in the present embodiment, it is not necessary to provide a heater separately from the column oven 30. Thus, the mobile phase supply device 10 can be made compact while the cost of the mobile phase supply device 10 is reduced.

(4) Inventive Example 1 and Comparative Example

In an inventive example 1, a pre-cooled phosphate potassium buffer and pre-cooled acetonitrile were used as an aqueous solution and an organic solvent respectively, and a mobile phase was supplied with use of the mobile phase supply device 10 of FIG. 1. Hereinafter, a phosphate potassium buffer is referred to as a liquid A, and acetonitrile is referred to as a liquid B. The same applies to a comparative example 1 and inventive examples 2 and 3, described below.

Specifically, in the inventive example 1, 50 mmol/L of the liquid A was stored in the storage 11, and 50 mmol/L of the liquid B was stored in the storage 12. The mixer 13 was controlled such that the liquid A and the liquid B were sent at the flow rate ratio of 45:55 from these storages 11, 12. Here, the mixer 13 is a low-pressure gradient unit.

Further, the portion having the length corresponding to 5 mL in each of the pipes 1, 2 was arranged in the column oven 30 such that the liquids A, B that respectively flow through the pipes 1, 2 stayed in the column oven 30 for about 10 minutes and were heated. The liquids A and B were heated by the column oven 30, mixed by the mixer 13 and sent downstream by the liquid sender 15.

Figure 4:
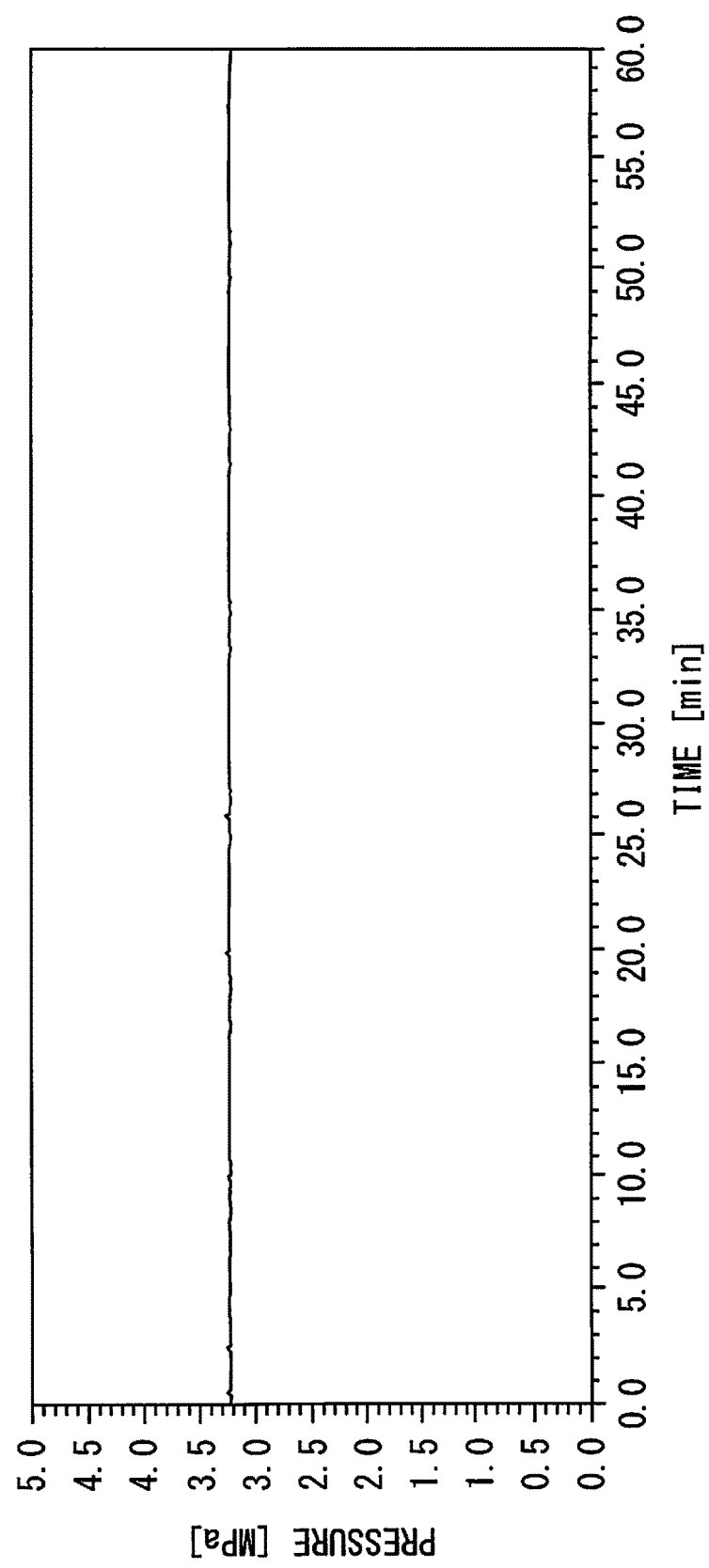
FIG. 4 is a diagram showing the temporal change of a pressure indication value of a liquid sender in an inventive example 1.

FIG. 4 is a diagram showing the temporal change of a pressure indication value of the liquid sender 15 in the inventive example 1. As shown in FIG. 4, in the inventive example 1, the pressure applied by the liquid sender 15 was substantially constant and did not change. Thus, in the inventive example 1, even when the liquids A and B were mixed, precipitation of salt did not occur. Thus, it was confirmed that a mobile phase could be stably supplied.

In the meantime, in the comparative example 1, a mobile phase was supplied similarly to the inventive example 1 by a liquid chromatograph having the configuration similar to that of the mobile phase supply device 10 of FIG. 1 except that the configuration for heating the pipes 1, 2 is not provided. Therefore, the liquids A and B were mixed by the mixer 13 without being heated and then sent downstream by the liquid sender 15.

Figure 5:
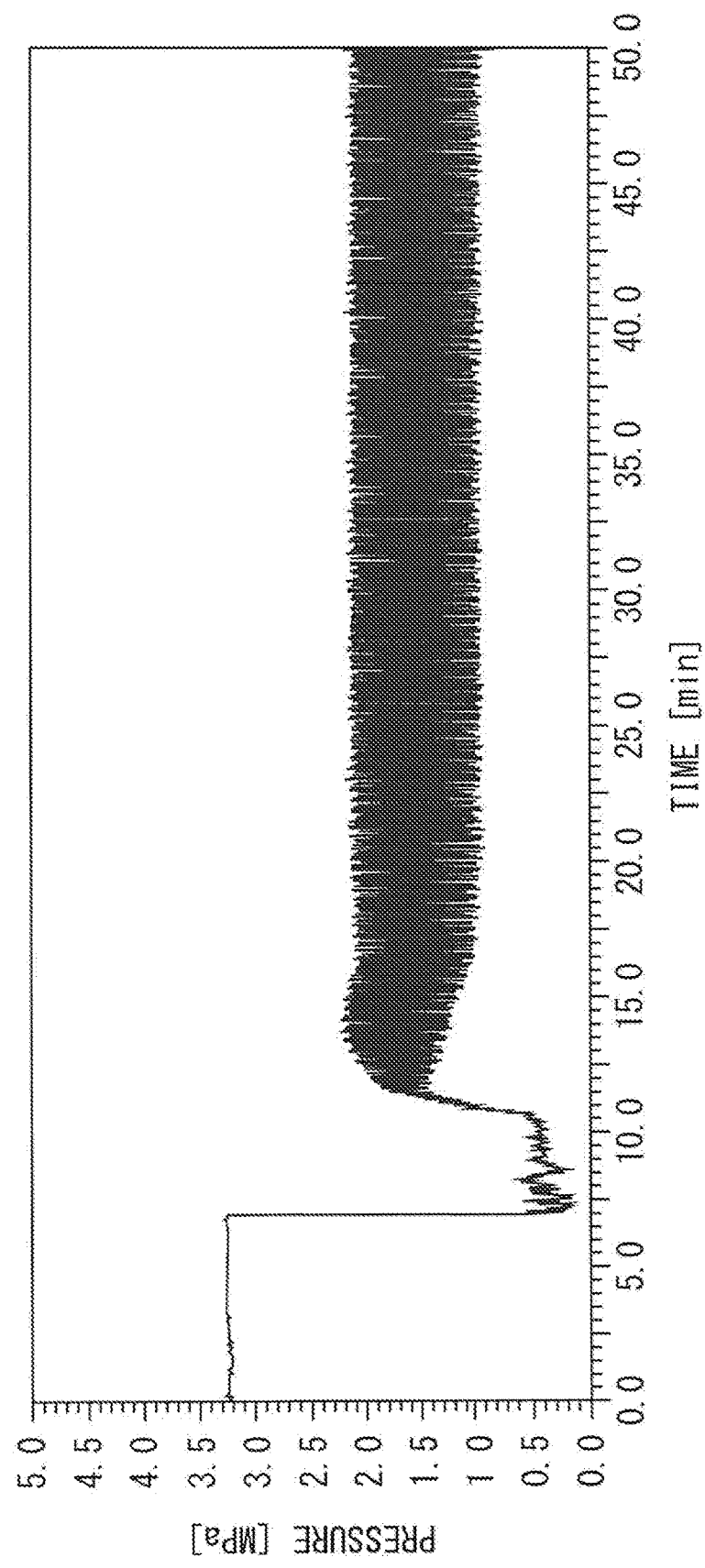
FIG. 5 is a diagram showing the temporal change of a pressure indication value of the liquid sender in a comparative example 1.

FIG. 5 is a diagram showing the temporal change of a pressure indication value of the liquid sender 15 in the comparative example 1. As shown in FIG. 5, in the comparative example 1, the pressure applied by the liquid sender 15 was substantially constant for about 7 minutes after the liquid sending was started and did not change. It was considered that the reason for this was that, because the temperature of the liquid sender 15 at the time of start of liquid sending was high, precipitation of salt did not occur. However, after 7 minutes has elapsed since the start of the liquid sending, the pressure applied by the liquid sender 15 changed little by little and drifted largely. Thus, the mobile phase could not be supplied stably. It was considered that the reason for this was that, because the temperature of the liquid sender 15 has decreased, precipitation of salt occurred.

(5) Inventive Example 2

In the inventive example 2, a sample was analyzed with use of the liquid chromatograph 100 of FIG. 1. The sample is a thiuram standard liquid, which is an agricultural chemical. Specifically, thiuram standard liquids, concentrations of which were 0.1 mg/L, 0.2 mg/L, 0.5 mg/L and 1.0 mg/L, were sequentially supplied to the injector 20 and introduced into the column 31 by the mobile phase that had been produced under the same conditions as those of the inventive example 1. Here, the column 31 is an ODS (octadecylsilyl) column, and the temperature of the column 31 is 40° C. The flow rate and the supply rate of the mobile phase are 1.0 mL/min and 20 μL, respectively.

Figure 6:
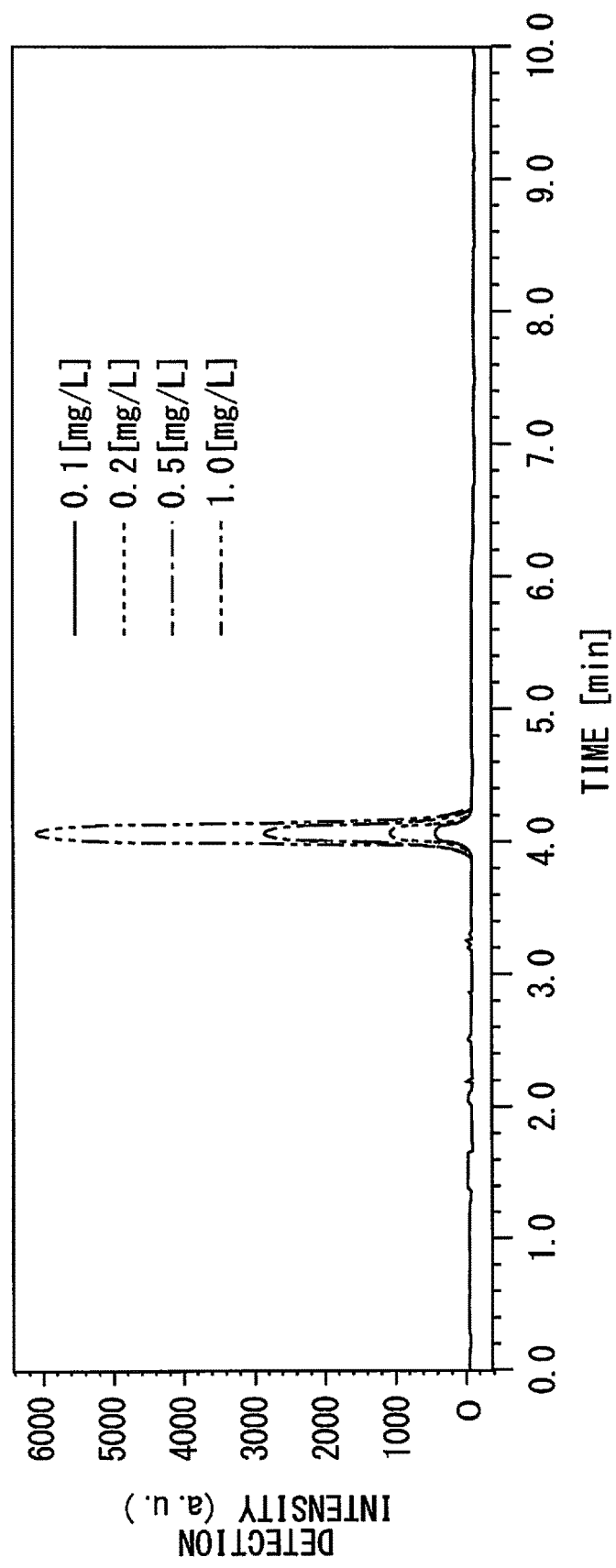
FIG. 6 is a diagram showing the results of analysis of samples in an inventive example 2.

FIG. 6 is a diagram showing the results of analysis of the samples in the inventive example 2. In FIG. 6, the abscissa indicates the time, and the ordinate indicates the detection intensity of the sample. Further, the results of analysis of the samples, the concentrations of which are 0.1 mg/L, 0.2 mg/L, 0.5 mg/L and 1.0 mg/L, are indicated by a solid line, a dotted line, a one-dot and dash line and a two-dots and dash line, respectively. As shown in FIG. 6, in the inventive example 2, the baseline of the detection intensity did not change regardless of the concentration of the sample. Thus, it was confirmed that the mobile phase was supplied stably, and the sample was detected and analyzed stably.

(6) Inventive Example 3

In the inventive example 3, the gradient analysis of a sample was carried out. Specifically, a thiuram standard liquid, the concentration of which was 1.0 mg/L, was used, and the ratio of the liquid A to the liquid B were changed consecutively in the range from 70:30 to 30:70. The other analysis conditions were the same as the analysis conditions in the inventive example 2.

Figure 7A:
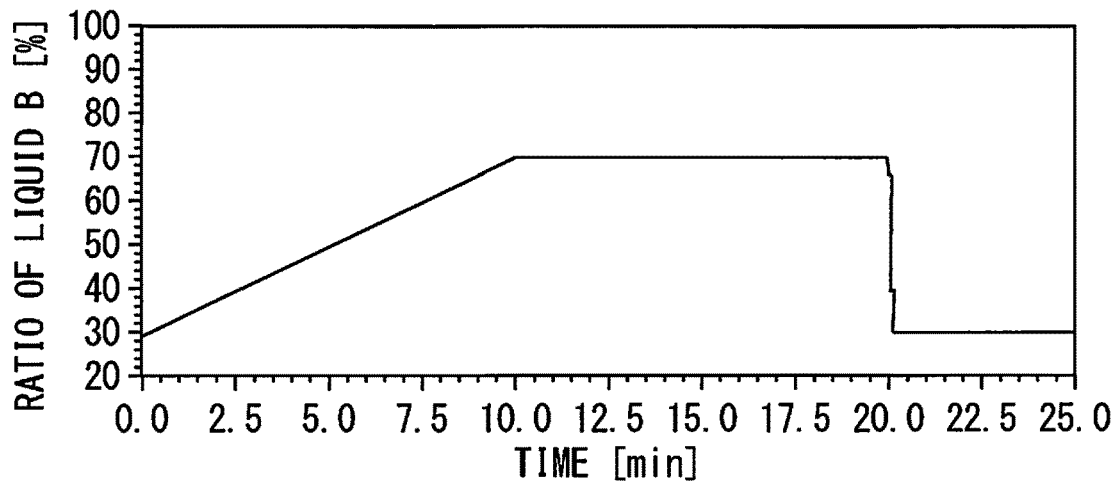
FIGS. 7A to 7C are diagrams showing the results of gradient analysis of samples in an inventive example 3.
Figure 7B:
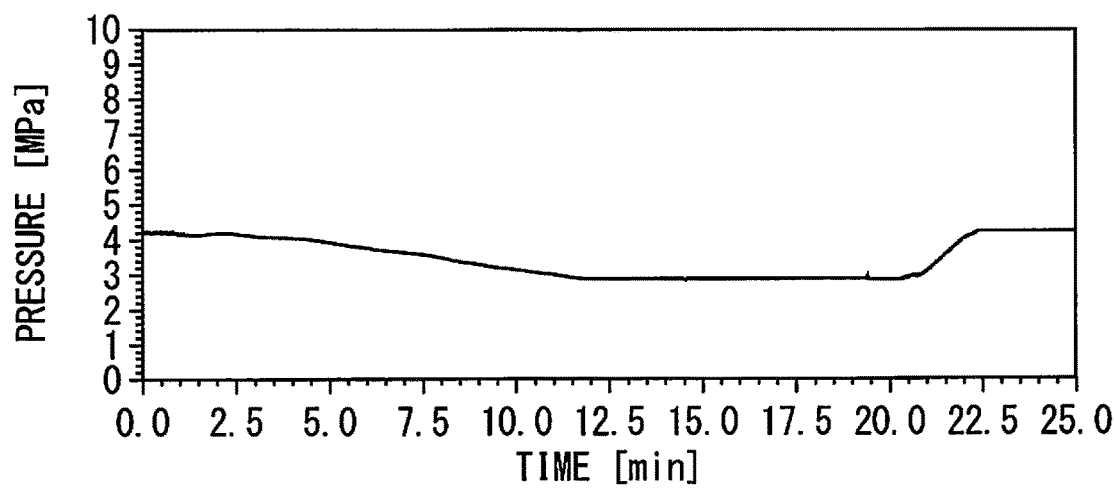
Figure 7C:
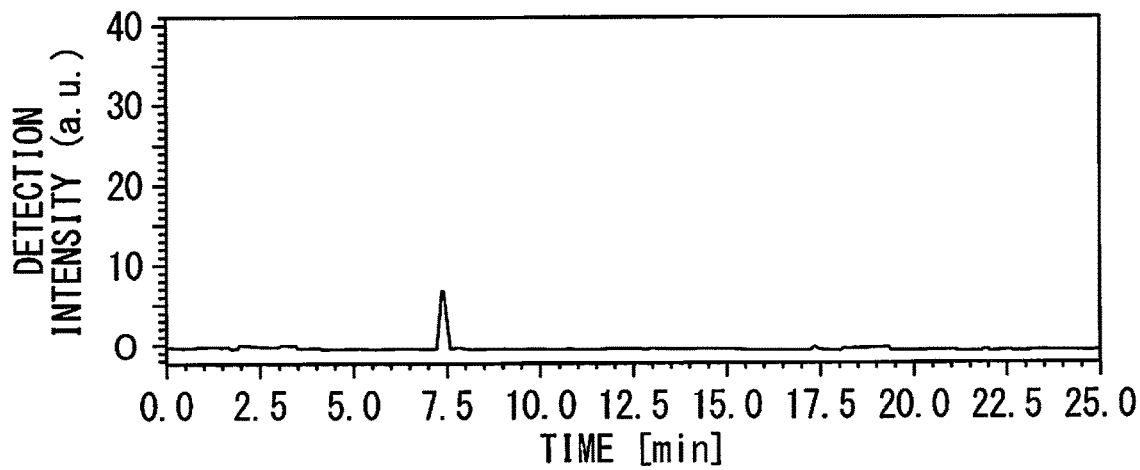

FIGS. 7A to 7C are diagrams showing the results of gradient analysis of the samples in the inventive example 3. The abscissas in FIGS. 7A to 7C indicate the common time, the ordinate in FIG. 7A indicates the ratio (concentration) of the liquid B, the ordinate in FIG. 7B indicates an indication value of the pressure applied by the liquid sender 15, and the ordinate in FIG. 7C indicates the detection intensity of the sample.

As shown in FIGS. 7A and 7B, even when the concentration of the liquid B was increased from 30% to 70%, the pressure applied by the liquid sender 15 did not change little by little. Thus, even when the liquid A was mixed with the liquid B having a high concentration, precipitation of salt did not occur. Therefore, it was confirmed that the mobile phase could be supplied stably. Further, as shown in FIG. 7C, the baseline of the detection intensity did not change. Thus, it was confirmed that the sample was detected stably and the gradient analysis was performed stably.

While preferred embodiments of the present invention have been described above, it is to be understood that variations and modifications will be apparent to those skilled in the art without departing the scope and spirit of the present invention. The scope of the present invention, therefore, is to be determined solely by the following claims.

I claim:

1. A liquid chromatograph comprising:
   a mobile phase supply device that produces a mobile phase;
   an injector to which the mobile phase produced by the mobile phase supply device and a sample are supplied;
   a column into which the mobile phase and the sample that have been supplied to the injector are introduced; and
   a detector that detects the sample that has passed through the column, wherein
   the mobile phase supply device includes
   a first storage that stores an aqueous solution including salt,
   a second storage that stores an organic solvent,
   a mixer that produces the mobile phase by mixing the aqueous solution stored in the first storage with the organic solvent stored in the second storage,
   a first pipe that connects the mixer to the first storage,
   a second pipe that connects the mixer to the second storage, and
   a heater that heats at least a portion of the first pipe and at least a portion of the second pipe such that a temperature of the mobile phase produced by the mixer is equal to or higher than a dissolution temperature of salt included in the aqueous solution.

2. The liquid chromatograph according to claim 1, further comprising a column oven that stores the column and adjusts a temperature of the column, wherein
   the column oven includes the heater and heats at least the portion of the first pipe and at least the portion of the second pipe while further storing at least the portion of the first pipe and at least the portion of the second pipe.

3. A mobile phase supply device that supplies a mobile phase to be used in liquid chromatograph analysis of a sample, comprising:
a first storage that stores an aqueous solution including salt;
a second storage that stores an organic solvent;
a mixer that produces a mobile phase by mixing the aqueous solution stored in the first storage with the organic solvent stored in the second storage;
a first pipe that connects the mixer to the first storage;
a second pipe that connects the mixer to the second storage; and
a heater that heats at least a portion of the first pipe and at least a portion of the second pipe such that a temperature of the mobile phase produced by the mixer is equal to or higher than a dissolution temperature of salt included in the aqueous solution.

4. A liquid chromatograph analysis method including:
producing a mobile phase by a mobile phase supply device;
supplying the mobile phase produced by the mobile phase supply device and a sample to an injector;
introducing the mobile phase and the sample that have been supplied to the injector to a column; and
detecting the sample that has passed through the column by a detector, wherein
the producing the mobile phase by the mobile phase supply device includes
leading an aqueous solution including salt stored in a first storage to a mixer through a first pipe,
leading an organic solvent stored in a second storage to the mixer through a second pipe,
producing the mobile phase by mixing the aqueous solution and the organic solvent by the mixer, and
heating at least a portion of the first pipe and at least a portion of the second pipe by a heater such that a temperature of the mobile phase produced by the mixer is equal to or higher than a dissolution temperature of salt included in the aqueous solution.

5. The liquid chromatograph analysis method according to claim 4, further including adjusting a temperature of the column by a column oven storing the column, wherein
the column oven includes the heater, and
the heating at least the portion of the first pipe and at least the portion of the second pipe includes
storing at least the portion of the first pipe and at least the portion of the second pipe in the column oven, and
heating at least the portion of the first pipe and at least the portion of the second pipe by the column oven.

6. A mobile phase supply method of supplying a mobile phase to be used in liquid chromatograph analysis of a sample, including:
leading an aqueous solution including salt stored in a first storage to a mixer through a first pipe;
leading an organic solvent stored in a second storage to the mixer through a second pipe;
producing the mobile phase by mixing the aqueous solution and the organic solvent by the mixer; and
heating at least a portion of the first pipe and at least a portion of the second pipe by a heater such that a temperature of the mobile phase produced by the mixer is equal to or higher than a dissolution temperature of salt included in the aqueous solution.

\* \* \* \* \*